(12) United States Patent
Saga

(10) Patent No.: US 10,229,334 B2
(45) Date of Patent: Mar. 12, 2019

(54) MAGNETIC INK CHARACTER READER AND MAGNETIC INK CHARACTER READING METHOD

(71) Applicant: TOSHIBA TEC KABUSHIKI KAISHA, Tokyo (JP)

(72) Inventor: Kengo Saga, Mishima Shizuoka (JP)

(73) Assignee: Toshiba TEC Kabushiki Kaisha, Tokyo (JP)

( * ) Notice: Subject to any disclaimer, the term of this patent is extended or adjusted under 35 U.S.C. 154(b) by 86 days.

(21) Appl. No.: 15/404,403

(22) Filed: Jan. 12, 2017

(65) Prior Publication Data

US 2017/0200055 A1  Jul. 13, 2017

(30) Foreign Application Priority Data

Jan. 13, 2016 (JP) .................................. 2016-004489

(51) Int. Cl.
  *G06K 9/18* (2006.01)
  *G06K 9/00* (2006.01)
  *G06Q 20/04* (2012.01)

(52) U.S. Cl.
  CPC .......... *G06K 9/186* (2013.01); *G06K 9/0053* (2013.01); *G06Q 20/042* (2013.01); *G06K 2209/01* (2013.01)

(58) Field of Classification Search
  CPC .... G06K 9/00; G06K 2209/01; G06K 9/0053; G06K 9/186; G06K 9/00442;

(Continued)

(56) References Cited

U.S. PATENT DOCUMENTS 5,097,517 A * 3/1992 Holt .................. G06K 9/00
                                          382/137
5,208,869 A * 5/1993 Holt .................. G06K 9/00
                                          382/138

(Continued)

FOREIGN PATENT DOCUMENTS

JP      2012221337 A   11/2012

OTHER PUBLICATIONS

Extended European Search Report dated Jun. 8, 2017, mailed in counterpart European Application No. 17151302.1, 7 pages.

*Primary Examiner* — Aklilu K Woldemariam
(74) *Attorney, Agent, or Firm* — Kim & Stewart LLP

(57) ABSTRACT

A magnetic ink character reader includes a transport unit configured to move a medium along a transport path, a reader configured to magnetically read magnetic ink characters printed on the medium, while the medium is moved along the transport path and to output a signal waveform corresponding to the magnetic ink characters, and a processor configured to compare a transportation direction of the medium through the reader to a forward reading direction of the reader, and to invert, in horizontal and vertical directions, the signal waveform output from the reader when the transportation direction is not the forward reading direction. The processor performs magnetic character recognition using the signal waveform from the reader when the transportation direction is the forward reading direction and the inverted signal waveform when the transportation direction is a reverse reading direction opposite the forward reading direction.

13 Claims, 6 Drawing Sheets

(58) Field of Classification Search
CPC ........... G06K 2017/0038; G06K 7/084; G06K 9/033; G06K 9/3208; G06K 9/03; G06Q 20/042; G06Q 40/02; G07D 11/0087; G07D 7/04; G07D 7/12; G07D 7/206; G07D 7/1205; G07D 7/164; G07D 7/20; G07F 19/20; G07F 19/202; G07F 19/205; B07C 3/00; B41J 3/44; B41J 11/006; B41J 11/52; B41J 13/025; B41J 13/03; B41J 3/46; H04N 1/00588; H04N 1/00591; H04N 1/00602; H04N 1/0057; H04N 1/00623; H04N 1/00649; H04N 1/12; H04N 2201/0081; C09D 11/50; C09K 11/02; C09K 11/06; C09K 11/08; C09K 11/7701; C09K 11/7706; C09K 11/7708; C09K 11/7709; C09K 11/7756; C09K 11/7769; C09K 11/7774; C09K 11/7776; C09K 11/7777
USPC ....... 382/101, 135, 137, 138, 139, 177, 178, 382/218
See application file for complete search history.

(56) References Cited

U.S. PATENT DOCUMENTS

| | | | |
|---|---|---|---|
| 5,504,822 A * | 4/1996 | Holt | G06K 9/00 382/135 |
| 6,473,519 B1 * | 10/2002 | Pidhirny | G06K 7/084 235/379 |
| 6,504,623 B1 * | 1/2003 | Ito | G06K 1/125 235/475 |
| 7,376,257 B2 * | 5/2008 | Nomura | G07D 7/04 194/207 |
| 8,023,717 B1 | 9/2011 | Gudenburr et al. | |
| 8,023,718 B1 * | 9/2011 | Gudenburr | G06K 7/084 235/449 |
| 8,083,136 B1 * | 12/2011 | Brown | G06Q 20/042 235/380 |
| 2003/0007676 A1 * | 1/2003 | Cato | G06Q 20/04 382/137 |
| 2005/0012967 A1 * | 1/2005 | Okamura | H04N 1/00681 358/474 |
| 2005/0127182 A1 * | 6/2005 | Nagata | G06K 13/06 235/454 |
| 2005/0252975 A1 * | 11/2005 | Furihata | G06K 13/16 235/475 |
| 2007/0110277 A1 * | 5/2007 | Hayduchok | B07C 3/00 382/101 |
| 2011/0192903 A1 * | 8/2011 | Berthiaud | G06K 7/084 235/449 |
| 2012/0201416 A1 * | 8/2012 | DeWitt | G06K 9/00442 382/101 |
| 2013/0008961 A1 * | 1/2013 | Sasaki | B65H 29/62 235/449 |

* cited by examiner

MAGNETIC INK CHARACTER READER AND MAGNETIC INK CHARACTER READING METHOD

CROSS-REFERENCE TO RELATED APPLICATION

This application is based upon and claims the benefit of priority from Japanese Patent Application No. 2016-004489, filed Jan. 13, 2016, the entire contents of which are incorporated herein by reference.

FIELD

Embodiments described herein relate generally to a magnetic ink character reader and a magnetic ink character reading method.

BACKGROUND

In commercial or consumer transactions, a check may be used as a method of payment. Information such as a check number may be shown in magnetic ink characters at a predetermined position on a front surface of the check along with a monetary amount and an authorizing signature. The magnetic ink characters are read by a magnetic ink character reader (MICR) including a magnetic head.

Usually, a magnetic head is disposed in a transport path of the check, and the magnetic ink characters are recognized using data obtained by scanning the check in a first direction and then a second direction opposite to the first direction.

However, such related art requires reading the check at least twice in different directions and is often ineffective and slow.

DETAILED DESCRIPTION

In general, according to one embodiment, a magnetic ink character reader includes a transport unit configured to move a medium along a transport path, a reader configured to magnetically read magnetic ink characters printed on the medium, while the medium is moved along the transport path and to output a signal waveform corresponding to the magnetic ink characters, the reader having a forward reading direction along the transport path for the medium, and a processor configured to compare a transportation direction of the medium through the reader to the forward reading direction of the reader, and to invert, in horizontal and vertical directions, the signal waveform output from the reader when the transportation direction is not the forward reading direction. The processor is further configured to perform magnetic character recognition using the signal waveform from the reader when the transportation direction is the forward reading direction and the inverted signal waveform when the transportation direction is a reverse reading direction opposite the forward reading direction.

Figure 1:
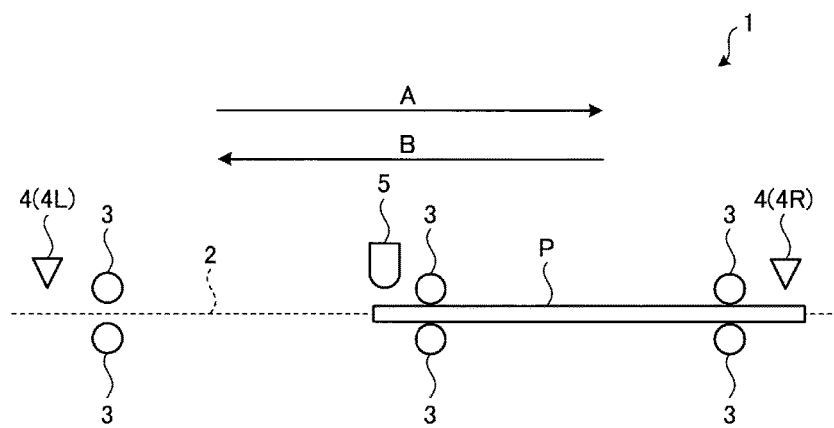
FIG. 1 is a diagram illustrating a schematic configuration of a magnetic ink character reader according to an embodiment.

FIG. 1 is a diagram illustrating a schematic configuration of a magnetic ink character reader. As illustrated in FIG. 1, a magnetic ink character reader 1 has a sheet transport path 2 along which a sheet P (a medium to be read) is transported. The sheet P is a sheet medium of a check or other document related to a financial or consumer transaction. Information such as a check number, a routing number, and/or an account number is printed in magnetic ink characters M at a predetermined position on a front surface of the sheet P with other information such as an amount of money and signature (see FIG. 2). The magnetic ink characters M are generally printed in a font type complying with a standard such as E-13B and CMC-7 (magnetic ink character recognition code).

Transport rollers 3 are provided along the sheet transport path 2, and these transport the sheet P along the sheet transport path 2 in reciprocating directions (indicated by an arrow A and an arrow B). A sheet sensor 4 is provided proximate to both ends of the sheet transport path 2, and detects the sheet P while it is on the sheet transport path 2. In FIG. 1, the sheet sensor 4 provided on a left end of the sheet transport path 2 is referred to as a sheet sensor 4L, and the sheet sensor 4 provided on a right end of the sheet transport path 2 is referred to as a sheet sensor 4R.

A magnetic head 5 magnetically reads the magnetic ink characters M printed on the sheet P, and outputs a signal waveform corresponding to an image of the magnetic ink characters M. When the sheet P is inserted into the sheet transport path 2 from a predetermined direction, one or more magnetic heads 5 are provided at such positions where the magnetic head(s) 5 can read the magnetic ink characters M from the sheet P. FIG. 1 illustrates an example in which a magnetic head 5 is provided above the sheet transport path 2. However, the disclosure is not limited thereto. A magnetic head 5 may instead, or in addition, be provided below the sheet transport path 2.

Figure 2:
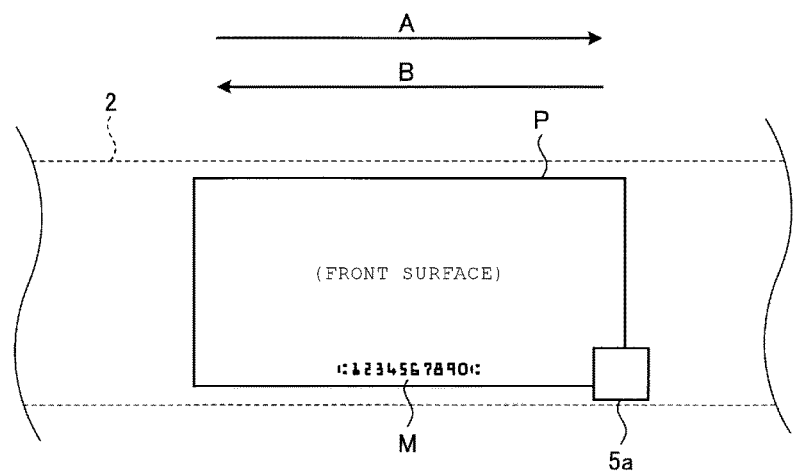
FIG. 2 is a diagram schematically illustrating an example of an installation position of a magnetic head.
Figure 3:
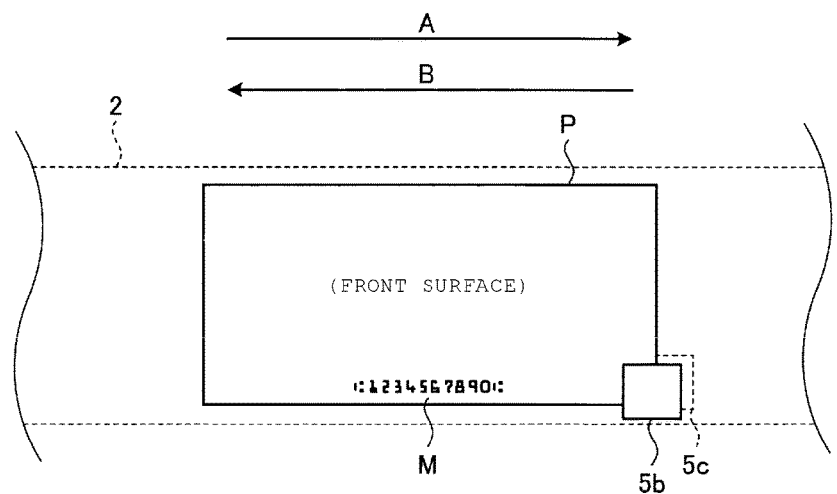
FIG. 3 is a diagram schematically illustrating another example of the installation position of the magnetic head.
Figure 4:
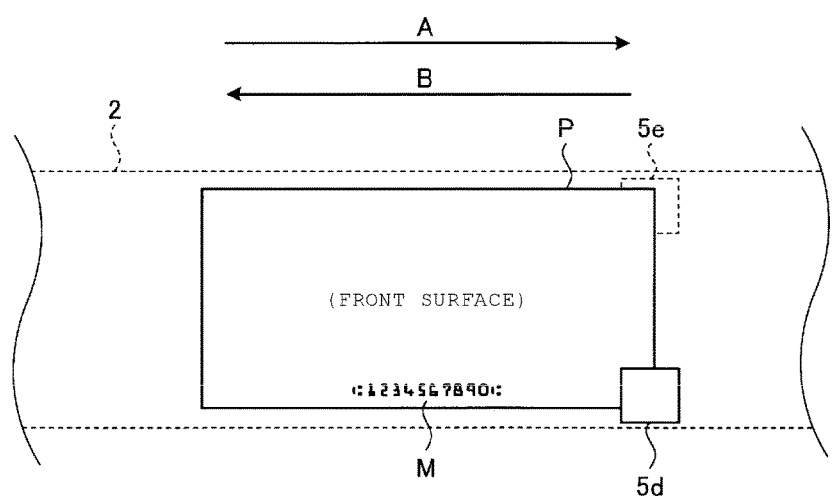
FIG. 4 is a diagram schematically illustrating still another example of the installation position of the magnetic head.

FIG. 2 to FIG. 4 are diagrams schematically illustrating examples of installation positions of the magnetic heads 5 (5a to 5e), and illustrate a state in which the sheet transport path 2 is viewed from the top. In FIG. 2 to FIG. 4, it is assumed that the magnetic ink characters M are printed on the front surface of the sheet P in such a format that the magnetic ink characters M are arranged on a lower side in a longitudinal direction thereof.

FIG. 2 illustrates an example in which a magnetic head 5a is provided. In the diagram, the magnetic head 5a is provided above the sheet transport path 2, and on one side (right page side in FIG. 2) along the longitudinal direction of the transport path 2. With the configuration, when the sheet P is inserted (transported) with the front surface of the sheet P facing upward and the magnetic ink characters M are printed left to right on the sheet P and on the same side of the transport path 2 as that on which the magnetic head 5a is installed, the magnetic head 5a can read the magnetic ink characters M. Hereinafter, this particular configuration is referred to as a "first configuration."

In addition, FIG. 3 schematically illustrates an example in which two magnetic heads 5b and 5c are provided at different positions from each other. In the diagram, the magnetic head 5b is provided above the sheet transport path 2, and on one side in the longitudinal direction. The magnetic head 5c is provided below the sheet transport path 2 at a position where the magnetic head 5c faces the magnetic head 5b. That is, as depicted in FIG. 3, magnetic head 5b at least partially overlaps magnetic head 5c when viewed from above the transport path 2. With this configuration, when the sheet P is inserted (transported) while the front surface of the sheet P faces upward and the side on which the magnetic ink characters M is on the side on which the magnetic head 5b is installed, the magnetic head 5b can read the magnetic ink characters M. In addition, when the sheet P is inserted (transported) with a rear surface of the sheet P facing upward and the side on which the magnetic ink characters M is the same side as that on which the magnetic head 5c is installed, the magnetic head 5c can read the magnetic ink characters M. Hereinafter, this particular configuration is referred to as a "second configuration".

FIG. 4 schematically illustrates an example in which two magnetic heads 5d and 5e are provided at different positions from each other. In FIG. 4, the magnetic head 5d is provided above the sheet transport path 2 and on one side of the transport path 2. The magnetic head 5e is provided below the sheet transport path 2 and on the other side of the transport path 2. With this configuration, when the sheet P is inserted (transported) with the front surface of the sheet P facing upward and the side on which the magnetic ink characters M are printed is on the side on which the magnetic head 5d is installed, the magnetic head 5d can read the magnetic ink characters M. When the sheet P is inserted (transported) with the rear surface of the sheet P facing upward and the magnetic ink characters M are on the same side as the magnetic head 5e is installed, the magnetic head 5e can read the magnetic ink characters M. Hereinafter, this particular configuration is referred to as a "third configuration".

As described above, the magnetic heads 5 (5a to 5e) can read the magnetic ink characters M from the sheet P when the sheet P is inserted into the sheet transport path 2 in particular directions. In addition, the installation position of the magnetic head 5 (5a to 5c) determines a reading direction in which the magnetic head 5 can read the magnetic ink characters M, that is, uniquely determines a suitable transport direction (hereinafter, referred to as a forward direction) of the sheet P that enables the magnetic head 5 to read the magnetic ink characters M. For example, it is assumed that a regular reading direction is defined as reading a character string of the magnetic ink characters M from the right end to the left end (when viewing the front surface). In this case, in the first configuration, a direction of the arrow A is would be the forward direction for the magnetic head 5a. In the second configuration, the direction of the arrow A would be the forward direction for the magnetic head 5b and a direction of the arrow B would be the forward direction for the magnetic head 5c. In the third configuration, the direction of the arrow A would be the forward direction for the magnetic head 5d and the direction of the arrow A would also be the forward direction for the magnetic head 5e. An identifier identifying each of the magnetic heads 5 (5a to 5e), that is, providing a correspondence relationship between the installation position of each magnetic head 5 and the respective forward direction (or reverse direction) can be stored in a ROM 12 or the like as setting information.

When the magnetic ink characters M are read in a direction (reverse direction) opposite to the forward direction, a signal waveform obtained will be different from a signal waveform obtained by reading in the magnetic ink characters M in forward direction.

Figure 5A:
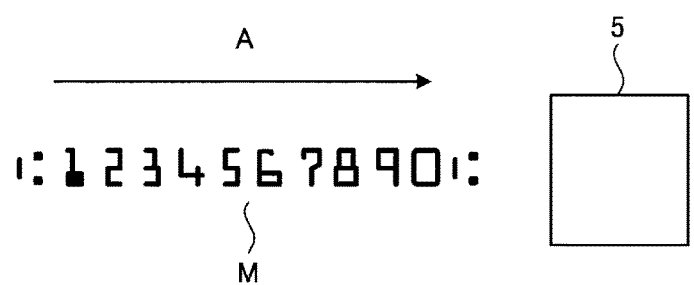
FIGS. 5A to 5B are diagrams illustrating examples of magnetic ink characters and a signal waveform obtained when the magnetic ink characters are read.
Figure 5B:
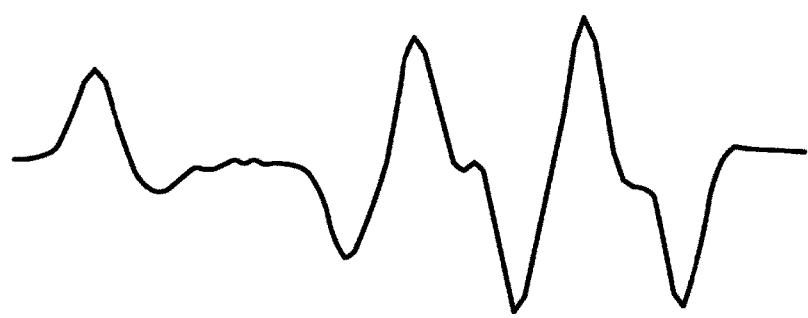
Figure 6A:
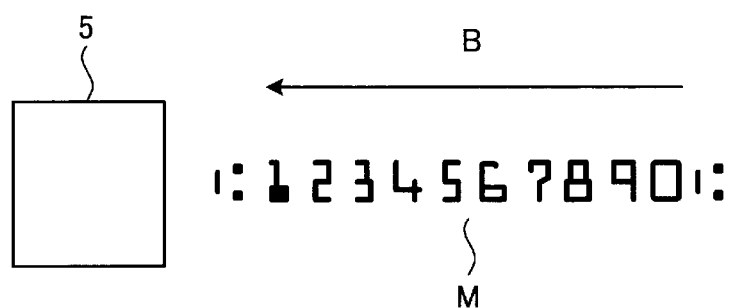
FIGS. 6A to 6B are diagrams illustrating the example of the magnetic ink characters and another example of a signal waveform obtained when the magnetic ink characters are read.
Figure 6B:
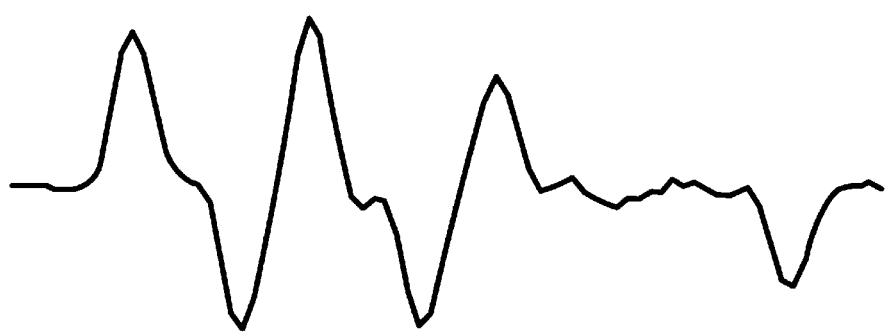

FIGS. 5A and 6A are diagrams illustrating an example of the magnetic ink characters M and FIGS. 5B and 6B are examples of a signal waveform obtained when the magnetic ink characters M are read in the indicated direction of FIGS. 5A and 6A, respectively. Her, the magnetic ink characters M include a string of numbers 1 to 0 and control characters on either end of the number string.

FIG. 5A illustrates an example in which the magnetic ink characters M are transported in the arrow A direction (forward direction) in the diagram at a speed of approximately 8 ips (inches per second) with respect to the magnetic head 5 having a gap length of 0.076 mm. In this case, as illustrated in FIG. 5B, the magnetic head 5 outputs a signal waveform in accordance with shapes of the magnetic ink characters M from the right end to the left end. The signal waveform represents change in magnetic charge per a predetermined sampling period, and thus has a waveform in accordance with the shapes of the magnetic ink characters M along the reading direction.

Meanwhile, FIG. 6A illustrates an example in which the magnetic ink characters M are transported in the arrow B direction (reverse direction) in the diagram at the same speed with respect to the magnetic head 5 having a gap length of 0.076 mm. In this case, as illustrated in FIG. 6B, the magnetic head 5 outputs a signal waveform in accordance with shapes of the magnetic ink characters M from the left end to the right end.

Here, when signal waveforms of FIG. 5B and FIG. 6B are compared, it can be seen that the signal waveforms are different from each other. However, a signal waveform obtained by inverting, vertically and horizontally, the signal waveform of FIG. 5B will approximately match the signal waveform of FIG. 6B. The vertical direction in FIG. 5B may be referred to as a lateral waveform direction and, the horizontal direction in FIG. 5B may be referred to as a longitudinal waveform direction.

As described above, the particular signal waveform obtained from the magnetic head 5 varies depending on the reading direction of the magnetic ink characters M. Therefore, when the sheet P is transported in the reverse direction, there is a problem that the magnetic ink characters M cannot be properly recognized from the signal waveform.

However, the magnetic ink character reader 1 of the present embodiment obtains the same signal waveform for a reverse reading of the magnetic ink character M as for a forward reading of the magnetic ink characters M by correcting the signal waveform for the reverse reading. Hereinafter, a control configuration of the magnetic ink character reader 1 will be described.

Figure 7:
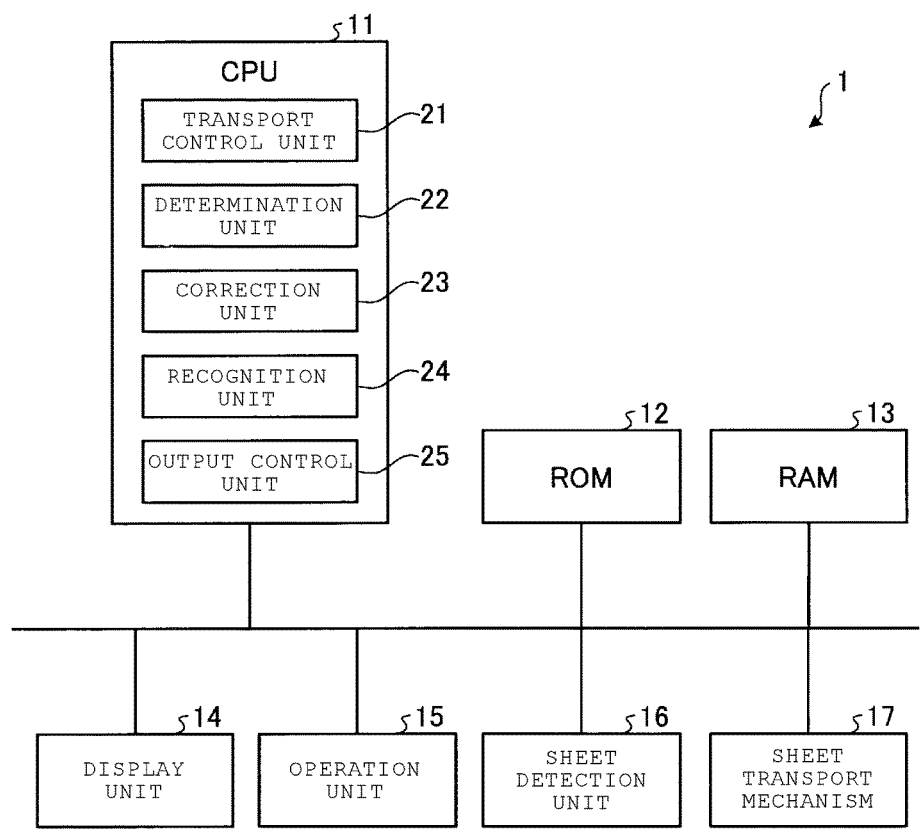
FIG. 7 is a diagram illustrating an example of a control configuration of the magnetic ink character reader according to the embodiment.

FIG. 7 is a diagram illustrating an example of the control configuration of the magnetic ink character reader 1. As illustrated in FIG. 7, the magnetic ink character reader 1 includes a central processing unit (CPU) 11, a read only memory (ROM) 12, a random access memory (RAM) 13, a display unit 14, an operation unit 15, a sheet detection unit 16, and a sheet transport mechanism 17, as well as the magnetic head 5 (see e.g., FIG. 1).

The CPU 11 integrally controls an operation of the magnetic ink character reader 1 by executing a program stored in the ROM 12. In addition, the CPU 11 provides various functional units, which will be described, by executing a program stored in the ROM 12.

The ROM 12 stores various programs (instructions) which can be executed by the CPU 11 and various types of setting information related to operation of the magnetic ink character reader 1. The RAM 13 may temporarily store data and programs when the CPU 11 executes various programs.

The display unit 14 includes a display device, such as a liquid crystal display (LCD), and displays various types of information under the control of the CPU 11. The operation unit 15 includes an input device such as an operation switch, and outputs operation contents that are input through the input device, to the CPU 11.

The sheet detection unit 16 includes the sheet sensors 4 (see e.g., FIG. 1), and detects a position of the sheet P on the sheet transport path 2 based on outputs of the sheet sensors 4.

The sheet transport mechanism 17 includes the sheet transport path 2 and the transport rollers 3 (see e.g., FIG. 1), and includes a drive motor for each of the transport rollers 3 and a drive circuit for controlling the drive motor. The sheet transport mechanism 17 can transport an inserted sheet P in the reciprocating directions of the arrow A and arrow B directions of FIG. 1 under the control of the CPU 11.

In addition, the CPU 11 provides a transport control unit 21, a determination unit 22, a correction unit 23, a recognition unit 24, and an output control unit 25.

The transport control unit 21 controls the transport direction of the sheet P on the sheet transport path 2 by controlling the sheet transport mechanism 17. Specifically, the transport control unit 21 determines the transport direction of the sheet P based on a detected sheet P position from the sheet detection unit 16.

For example, when the sheet P is inserted from the left end of the sheet transport path 2 illustrated in FIG. 1, the sheet detection unit 16 detects a position of the sheet P by the output or response of sheet sensor 4L. In this case, the transport control unit 21 then controls the sheet transport mechanism 17 (e.g., one or more roller 3) so as to transport the sheet P in the direction of the arrow A along the sheet transport path 2. In another example, when the sheet P is inserted from the right end of the sheet transport path 2 illustrated in FIG. 1, the sheet detection unit 16 detects the position of the sheet P by the output or response of sheet sensor 4R. In this case, the transport control unit 21 then controls the sheet transport mechanism 17 so as to transport the sheet P in the direction of the arrow B along the transport path 2.

When the magnetic ink characters M are read by the magnetic head 5, the determination unit 22 determines whether or not the transport direction of the sheet P is the forward direction (first direction) or the reverse direction (second direction) at the time of the reading. More specifically, the determination unit 22 compares whether or not the transport direction of the sheet P and the forward direction corresponding to an identifier (or installation position) of the magnetic head 5 being used to read the magnetic ink characters M coincide with each other. The identifier of the magnetic head 5 is stored as setting information.

For example, in the case of the first configuration (see FIG. 2), when magnetic head 5a reads the magnetic ink characters M, the determination unit 22 determines whether or not the sheet P is being or was transported in the arrow A direction. Here, when the sheet P is being transported in the arrow A direction, the determination unit 22 determines that the sheet P is transported in the forward direction (with respect to magnetic head 5a). However, if the sheet P is being or was transported in the arrow B direction, the determination unit 22 determines that the sheet P is transported in the reverse direction (with respect to magnetic head 5a).

In the case of the second configuration (see FIG. 3), when the magnetic head 5b reads the magnetic ink characters M, the determination unit 22 determines whether or not the sheet P is being or was transported in the arrow A direction. Here, when the sheet P is transported in the arrow A direction, the determination unit 22 determines that the sheet P is transported in the forward direction (with respect to magnetic head 5b). If the sheet P is transported in the arrow B direction, the determination unit 22 determines that the sheet P is transported in the reverse direction (with respect to magnetic head 5b). When the magnetic head 5c reads the magnetic ink characters M, the determination unit 22 determines whether or not the sheet P is being or was transported in the arrow B direction. Here, when the sheet P is transported in the arrow B direction, the determination unit 22 determines that the sheet P is transported in the forward direction (with respect to magnetic head 5c). If the sheet P is transported in the arrow A direction, the determination unit 22 determines that the sheet P is transported in the reverse direction (with respect to magnetic head 5c).

In the case of the third configuration (see FIG. 4), when the magnetic head 5d or 5e reads the magnetic ink characters M, the determination unit 22 determines whether or not the sheet P is being or was transported in the arrow A direction. Here, when the sheet P is transported in the arrow A direction, the determination unit 22 determines that the sheet P is transported in the forward direction (with respect to either magnetic head 5d or 5e). If the sheet P is transported in the arrow B direction, the determination unit 22 determines that the sheet P is transported in the reverse direction (with respect to either magnetic head 5d or 5e).

When the magnetic head 5 does not read the magnetic ink characters M even though the sheet P is being transported, the determination unit 22 determines that the orientation/direction of the sheet P is inappropriate. In this case, the determination unit 22 performs notification by displaying on the display unit 14 a notification screen to instruct change of the orientation/direction of the sheet P.

When the determination unit 22 determines that the transport direction of the sheet P is the reverse direction, the correction unit 23 performs a correction to invert, in the horizontal and vertical directions, a signal waveform output by the magnetic head 5. By this correction, the signal waveform becomes substantially equivalent to a signal waveform that would be obtained by a reading in the forward direction.

When the determination unit 22 determines that the transport direction of the sheet P is the forward direction, the recognition unit 24 recognizes the magnetic ink characters M based on the signal waveform output by the magnetic head 5 without inversion. In addition, when the determination unit 22 determines that the transport direction of the sheet P is the reverse direction, the recognition unit 24 recognizes the magnetic ink characters M based on the corrected (inverted) signal waveform provided by the correction unit 23. Specifically, the recognition unit 24 collates either the signal waveform read by the magnetic head 5 or the corrected signal waveform provided by the correction unit 23, to a registration waveform pattern for character recognition in which a signal waveform pattern for each character has been previously registered or established. Accordingly, the recognition unit 24 obtains a degree of similarity between the registration waveform patterns and the signal waveforms, and recognizes characters in the signal waveforms by the degrees of similarity with the registration waveform pattern (when, for example, the degree of similarity is equal to or greater than a reference value).

The output control unit 25 outputs the characters as recognized by the recognition unit 24 to the display unit 14. An output method is not particularly limited, and may include output the characters as recognized to a device other than the display unit 14. For example, when the magnetic ink character reader 1 includes a printer, the output control unit 25 may output the characters as read to the printer.

Figure 8:
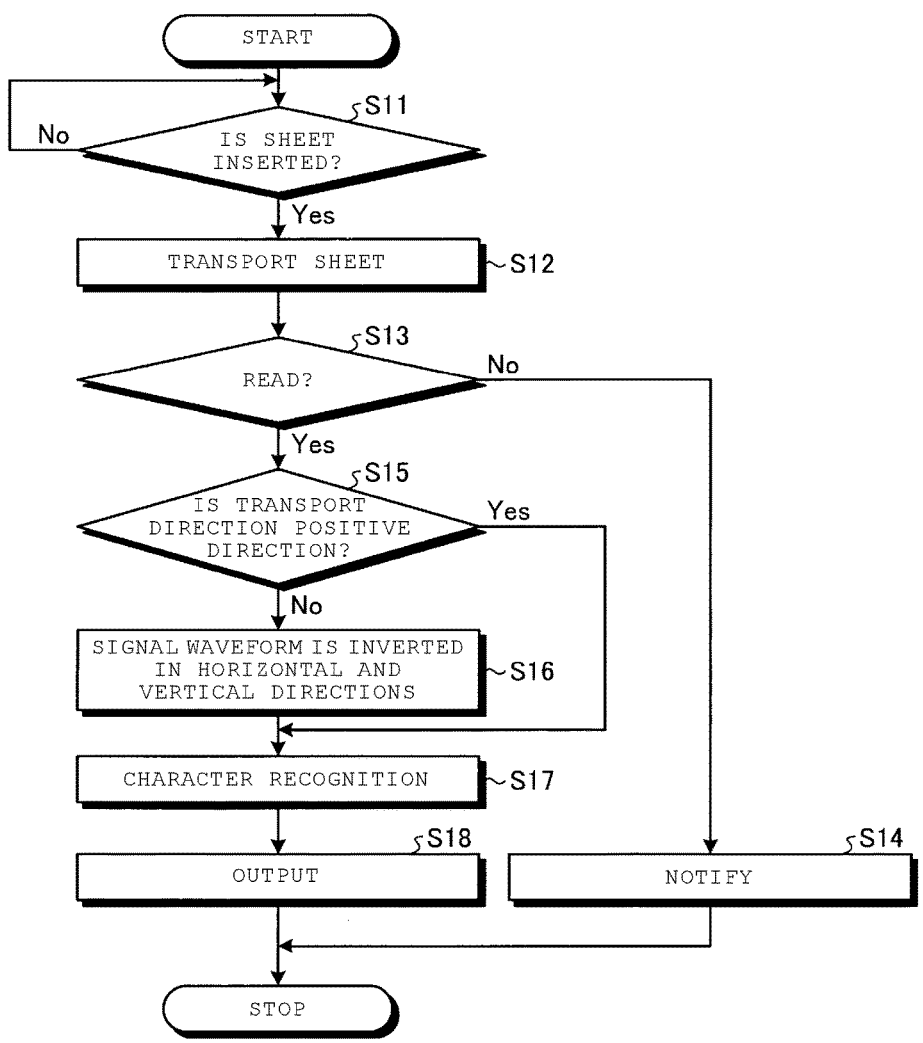
FIG. 8 is a flowchart for explaining an operation of the magnetic ink character reader according to the embodiment.

Hereinafter, with reference to FIG. 8, an operation of the magnetic ink character reader 1 will be described. First, the transport control unit 21 waits (idles) until the sheet P is inserted into the sheet transport path 2. Insertion of the sheet P into the transport may be detected based on a detection result of the sheet detection unit 16 (step S11; No sheet inserted). When the sheet P is inserted into the sheet transport path 2 (step S11; Yes), the transport control unit 21 transports the sheet P toward an opposite end from that at which the sheet P has been inserted (step S12).

Then, the determination unit 22 detects whether or not the magnetic head 5 reads the magnetic ink characters M during the transport of the sheet P along the sheet transport path (step S13). Here, when a reading is not performed (step S13; No), the determination unit 22 determines that the direction/orientation of the sheet P is inappropriate. Accordingly, the determination unit 22 displays on the display unit 14 a notification screen that prompts to change the direction/orientation of the sheet P (step S14), and terminates the processing.

If the magnetic head 5 reads the magnetic ink characters M (step S13; Yes), the determination unit 22 refers to the setting information (stored, for example, in ROM 12). Next, the determination unit 22 determines whether or not the transport direction of the sheet P coincides with the forward direction of the magnetic head 5 which has read the magnetic ink characters M (step S15). Here, when the determination unit 22 determines that the sheet P transport direction and the forward direction of the magnetic head 5, which has read the magnetic ink characters M coincide with each other, that is, when the determination unit 22 determines that the transport direction is the forward direction with respect to magnetic head 5 (step S15; Yes), the process proceeds directly to step S17 (bypassing step S16).

When the determination unit 22 determines that the sheet transport and magnetic head read directions do not coincide with each other, that is, when the determination unit 22 determines that the transport direction is the reverse direction with respect to the magnetic head 5 (step S15; No), the correction unit 23 inverts, in the horizontal and vertical directions, the signal waveform provided by the magnetic head 5 (step S16), and the process proceeds to step S17.

In step S17, the recognition unit 24 collates the signal waveform read by the magnetic head 5 or the signal waveform inverted by the correction unit 23, and the registration waveform patterns, and recognizes the characters corresponding to the signal waveform from the magnetic head 5 (corrected or uncorrected as the case may be) (step S17). Accordingly, the output control unit 25 outputs the characters recognized by the recognition unit 24 to the display unit 14 or the like (step S18), and terminates the process.

As described above, the magnetic ink character reader 1 determines whether or not the sheet P (magnetic ink character M) is being or has been transported in the forward direction with respect to the magnetic reader 5 that reads the magnetic ink characters M. In addition, when the sheet P (magnetic ink character M) is transported in the reverse direction with respect to the magnetic head that reads the magnetic ink characters M, the magnetic ink character reader 1 inverts the signal waveform read by the magnetic head 5, and recognizes the magnetic ink characters M based on the corrected/inverted signal waveform. With this process, even when the sheet P is transported along either of the arrow A or the arrow B directions illustrated in FIG. 1, the magnetic ink character reader 1 can correctly read the magnetic ink characters M.

While certain embodiments have been described, these embodiments have been presented by way of example only, and are not intended to limit the scope of the present disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the present disclosure.

For example, the possible installation positions of the magnetic head 5 are not limited to the first to third configurations, and can be appropriately changed in accordance with an expected format of the sheet P. In addition, by combining the first, second, and/or third configurations, one magnetic head 5 may be provided below the sheet transport path 2, and the magnetic heads 5 may be provided below and above the sheet transport path 2 or on both sides of the transport path 2 in the longitudinal direction.

In addition, a transportation method of the sheet P is not limited to the particular examples. For example, the transport control unit 21 may initially transport the sheet P toward an opposite end from the sheet insertion end and then, transport the sheet P in the reverse direction so as to return the sheet P to the insertion end. As described above, when the sheet P is transported in a reciprocating manner, a magnetic head 5 can read the sheet P two times, once in a forward path direction and once in a backward path direction. In this case, the determination unit 22 determines whether the sheet P transport direction is the forward direction or the reverse direction for each of the forward path and the backward path, and the correction unit 23 inverts the signal waveform for the readings made in the reverse direction. The recognition unit 24 may perform the character recognition by using both signal waveforms obtained in the two readings, or may perform the character recognition by using a signal waveform obtained for any one of the readings.

In addition, a program executed by the magnetic ink character reader 1 may be provided as a recording on a non-volatile computer readable recording medium such as a floppy disk, a compact disc (CD), a compact disc-recordable (CD-R), a compact disk read only memory (CD-ROM), a digital versatile disc (DVD), an SD memory card, and a universal serial bus (USB) memory, as an installable format file or an executable format file.

In addition, the program executed by the magnetic ink character reader 1 may be configured to operate on a computer connected to a network such as the Internet, and may be downloaded, operated, implemented or the like via a network.

In addition, each functional unit of the magnetic ink character reader 1 can also be separately realized or implemented in hardware/circuitry as one or more processing circuit in the magnetic ink character reader 1. Here, a processing circuit includes hardware such as a processor (for example, CPU 11) described above, and an application specific integrated circuit (ASIC) and a printed circuit module configured to realize each described function.

What is claimed is:

1. A magnetic ink character reader, comprising:
   a transport mechanism configured to move a medium along a transport path;
   a reader configured to magnetically read magnetic ink characters printed on the medium, while the medium is being moved along the transport path and to output a signal waveform corresponding to the magnetic ink characters, the reader having a forward reading direction along the transport path for the medium; and
   a processor configured to compare a transportation direction of the medium through the reader to the forward reading direction of the reader, and to invert, in horizontal and vertical directions, the signal waveform output from the reader when the transportation direction is not the forward reading direction,
   wherein the processor is further configured to perform magnetic character recognition using the signal waveform from the reader when the transportation direction is the forward reading direction and the inverted signal waveform when the transportation direction is a reverse reading direction opposite the forward reading direction, wherein the reader is a magnetic head,
   wherein the transport mechanism comprises at least one roller configured to engage the medium, and
   wherein the processor is configured to compare one of the signal waveform and the inverted signal waveform to a reference waveform and determine a similarity value for the reference waveform in comparison to the one of the signal waveform and the inverted signal waveform.

2. The magnetic ink character reader according to claim 1, further comprising:
   a detector including at least one sensor configured to detect a presence of the medium along the transport path.

3. The magnetic ink character reader according claim 1, further comprising:
   a notification unit configured to indicate an orientation of the medium is to be changed when the reader cannot read the magnetic ink character when the medium is transported along the transport path.

4. The magnetic ink character reader according claim 3, wherein the notification unit is a display.

5. A method of reading magnetic ink characters printed on a medium, the method comprising:
   moving the medium along a transport path in a first direction; reading the magnetic ink characters printed on the medium with a reader that outputs a signal waveform corresponding to the magnetic ink characters, the reader being configured to have a forward reading direction along the transport path;
   comparing the first direction to the forward reading direction of the reader; inverting, in the horizontal and vertical direction, the signal wave output from the reader to provide an inverted signal waveform when the first direction is not the forward reading direction; and
   recognizing the magnetic ink characters using the signal waveform output from the reader when the first direction is the forward reading direction and using the inverted signal waveform when the first direction is not the forward reading direction, wherein the reader comprises a magnetic head,
   recognizing the magnetic ink characters includes comparing one of the signal waveform and the inverted signal waveform to a reference waveform to determine a similarity value for the reference waveform in comparison to the one of the signal waveform and the inverted signal waveform, and
   moving the medium along the transport path in the first direction comprises engaging the medium with at least one pair of rollers positioned along the transport path.

6. The method of claim 5, further comprising:
   Indicating with a notification unit that orientation of the medium is to be changed when the reader can't read the magnetic ink characters when the medium is transported along the transport path in the first direction.

7. The method of claim 5, wherein the medium is a check.

8. The method of claim 7, wherein the magnetic ink characters are printed on the medium in a font type complying with a standard magnetic ink character recognition code.

9. A check reader, comprising:
   a roller pair configured to move a check along a transport path by engaging the check;
   a first magnetic head positioned to read magnetic ink characters disposed on a surface of the check while the check is moving along the transport path in a particular orientation and to generate a signal waveform corresponding to the magnetic ink characters disposed on the surface of the check when the check is in the particular orientation;
   a sensor disposed proximate to a position along the transport path, the sensor configured to detect a presence of the check at the position; and a controller configured to:
   determine a direction of travel of the check along the transport path according to an output of the sensor,
   compare the direction of travel to a pre-established forward reading direction of the first magnetic head,
   when the pre-established forward reading direction matches the direction of travel, use the signal waveform to recognize the magnetic ink characters, and
   when the pre-established forward reading direction does not match the direction of travel, generate an inverted signal waveform by inverting, in longitudinal and lateral directions, the signal waveform, and then use the inverted signal waveform to recognize the magnetic ink characters, wherein the magnetic ink characters are recognized by comparing one of the signal waveform and the inverted signal waveform to a reference waveform to determine a similarity value for the reference waveform in comparison to the one of the signal waveform and the inverted signal waveform.

10. The check reader according to claim 9, further comprising:
    a second magnetic head positioned opposite the first magnetic head and facing the first magnetic head in a direction orthogonal to the surface of the check.

11. The check reader according to claim 9, wherein a pre-established forward reading direction of the second magnetic head is opposite the pre-established forward reading direction of the first magnetic head.

12. The check reader according to claim 9, further comprising:
    a second magnetic head offset from the first magnetic head in a direction parallel to the surface of the check and facing in a direction orthogonal to the surface of the check.

13. The check reader according to claim 12, wherein a pre-established forward reading direction of the second magnetic head matches the pre-established forward reading direction of the first magnetic head.

* * * * *